(12) United States Patent
Kanzawa

(10) Patent No.: US 8,767,132 B2
(45) Date of Patent: Jul. 1, 2014

(54) TELEVISION RECEIVER AND ELECTRONIC DEVICE

(75) Inventor: Kazunori Kanzawa, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/460,427

(22) Filed: Apr. 30, 2012

(65) Prior Publication Data

US 2013/0050592 A1 Feb. 28, 2013

(30) Foreign Application Priority Data

Aug. 23, 2011 (JP) ................................ 2011-182005

(51) Int. Cl.
*H04N 5/64* (2006.01)
*F16B 5/06* (2006.01)
*F16M 11/00* (2006.01)
*G02F 1/1333* (2006.01)

(52) U.S. Cl.
CPC ............... *H04N 5/64* (2013.01); *F16B 5/0642* (2013.01); *F16M 11/00* (2013.01); *G02F 1/133308* (2013.01)
USPC ............................ 348/843; 348/836; 348/841

(58) Field of Classification Search
CPC .......... H04N 5/12; H04N 5/64; F16B 5/0642; F16M 11/00; F16M 13/02; G02F 1/133308
USPC .................... 348/836–841; 248/225; 361/679
See application file for complete search history.

(56) References Cited

U.S. PATENT DOCUMENTS

| | | | |
|---|---|---|---|
| 6,477,039 B2* | 11/2002 | Tajima ...................... | 361/679.21 |
| 6,919,937 B2* | 7/2005 | Kim et al. ...................... | 349/58 |
| 7,661,640 B2* | 2/2010 | Persson ..................... | 248/225.11 |
| 7,961,457 B2* | 6/2011 | Huang ...................... | 361/679.21 |
| 8,134,651 B1* | 3/2012 | Reid .............................. | 348/841 |
| 8,264,827 B2* | 9/2012 | Yuan et al. ................ | 361/679.21 |
| 8,292,244 B2* | 10/2012 | Okada ....................... | 248/225.21 |

(Continued)

FOREIGN PATENT DOCUMENTS

| | | | | |
|---|---|---|---|---|
| JP | 2000-305068 | | 11/2000 | |
| JP | 2006106632 A | * | 4/2006 | ............... 361/679.01 |

(Continued)

OTHER PUBLICATIONS

Japanese Patent Application No. 2011-182005; Decision to Grant a Patent; Mailed Aug. 7, 2012 (with English translation).

*Primary Examiner* — William C Vaughn, Jr.
*Assistant Examiner* — Luis M Perez
(74) *Attorney, Agent, or Firm* — Blakely, Sokoloff, Taylor & Zafman LLP

(57) ABSTRACT

According to one embodiment, a television receiver includes a display device, a first member, a second member, a support member, and a support portion. The display device includes a display screen and a side surface. The first member includes a first wall facing the side surface. The second member is located opposite the first member with respect to the display screen and includes a second wall facing the side surface. The support member is attached to the first member and located on the side surface of the first wall. The support member supports the display device on a side opposite the display screen. The support portion is provided to an end of the first member and includes a portion extending toward a side opposite the display screen on the side surface side of the second wall. The support portion supports the support member between the portion and the second wall.

10 Claims, 10 Drawing Sheets

(56) References Cited

U.S. PATENT DOCUMENTS

| | | | |
|---|---|---|---|
| 8,379,157 B2 * | 2/2013 | Morita | 348/836 |
| 2004/0239820 A1 * | 12/2004 | Jeong | 348/787 |
| 2007/0046837 A1 * | 3/2007 | Elberbaum | 348/739 |
| 2011/0116217 A1 * | 5/2011 | Lee et al. | 361/679.01 |

FOREIGN PATENT DOCUMENTS

| | | |
|---|---|---|
| JP | 2008-047144 | 2/2008 |
| JP | 2009-058915 | 3/2009 |
| JP | 2009-134269 | 6/2009 |

* cited by examiner

US 8,767,132 B2

TELEVISION RECEIVER AND ELECTRONIC DEVICE

CROSS-REFERENCE TO RELATED APPLICATIONS

This application is based upon and claims the benefit of priority from Japanese Patent Application No. 2011-182005, filed Aug. 23, 2011, the entire contents of which are incorporated herein by reference.

FIELD

Embodiments described herein relate generally to a television receiver and an electronic device.

BACKGROUND

There have been known television (TV) receivers having a housing the front cover of which is fixed to a display device with brackets.

TV receivers of this type are required to have a structure with less inconvenience such as, for example, a structure in which the housing has high rigidity at a portion provided with the brackets.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a television receiver comprises a display device, a first member, a second member, a support member, and a support portion. The display device includes a display screen and a side surface. The display device comprises a display screen and a side surface. The first member comprises a first wall that faces the side surface. The second member is located opposite the first member with respect to the display screen and comprises a second wall that faces the side surface. The support member is attached to the first member and located on the side surface of the first wall. The support member is configured to support the display device on a side opposite the display screen. The support portion is provided to an end of the first member on the second member side and comprises a portion extending toward a side opposite the display screen on the side surface side of the second wall. The support portion is configured to support the support member between the portion and the second wall.

Exemplary embodiments will be described in detail below with reference to the accompanying drawings, in which, for the sake of convenience, directions (X, Y, and Z directions) are defined as follows: X direction indicates the long-side direction of a display screen 6a in the front view; Y direction indicates the short-side direction of the display screen 6a in the front view; and Z direction indicates the front-back direction of the display screen 6a in the front view (the depth direction, the thickness direction of a housing 2). The X, Y, and Z directions are perpendicular to one another.

While, in an embodiment described below, an electronic device is described as a television (TV) receiver, it is not so limited. The electronic device of the embodiment may be any other devices such as a personal computer (PC), a smartphone, a smartbook, a mobile telephone, a personal digital assistant (PDA), a video display device, a TV telephone, and the like.

Figure 1:
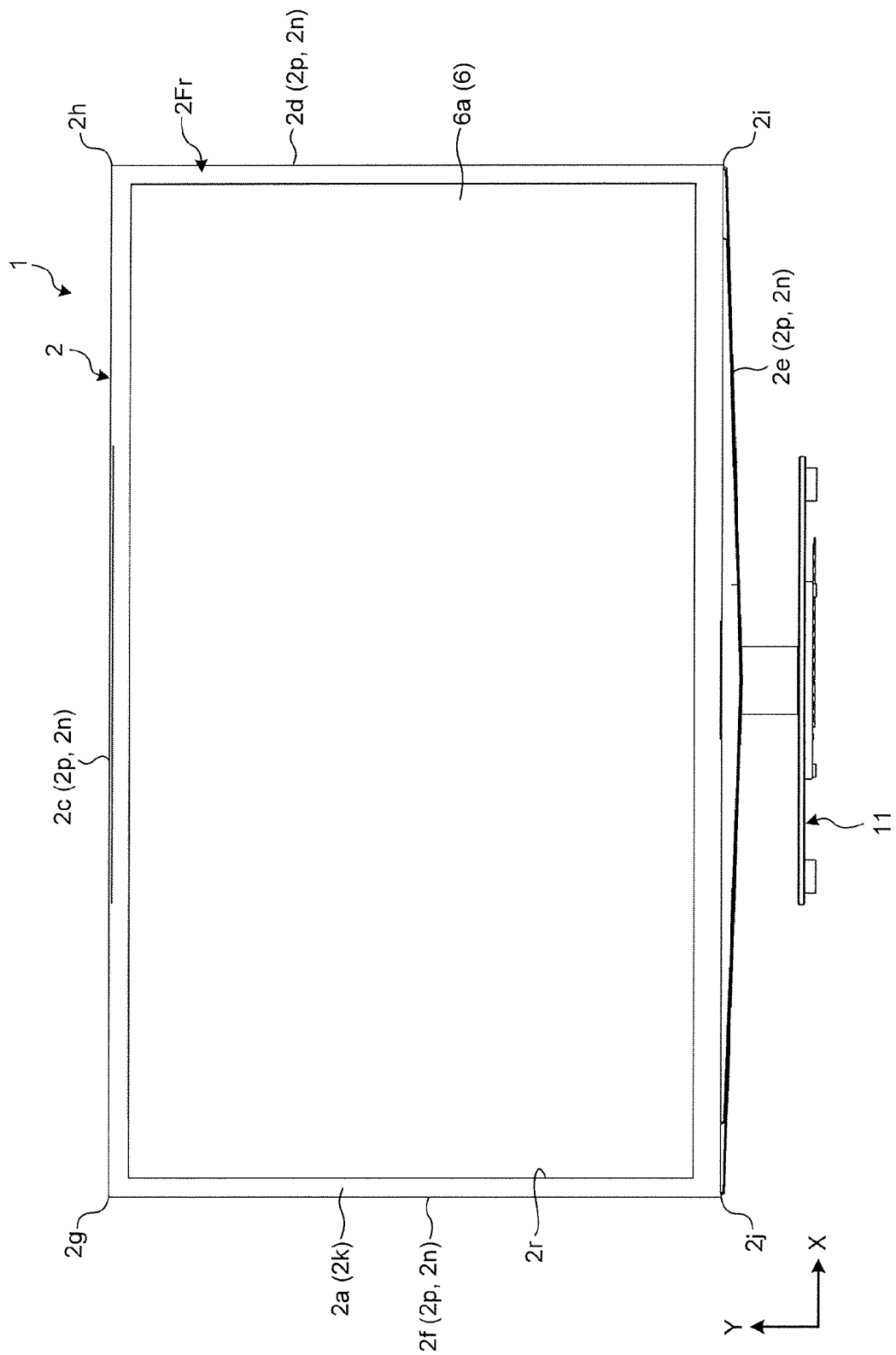
FIG. 1 is an exemplary front view of a television (TV) receiver according to an embodiment.
Figure 2:
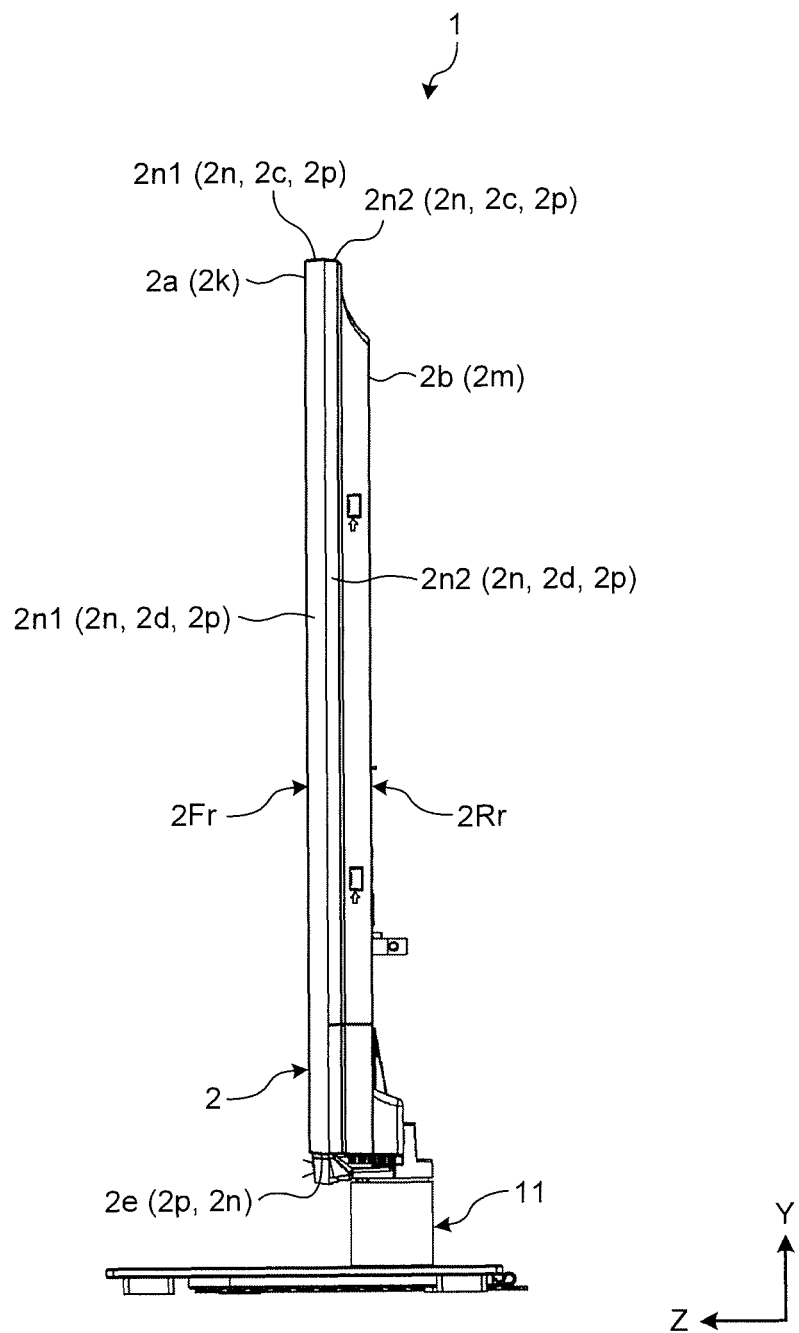
FIG. 2 is an exemplary side view of the TV receiver in the embodiment.
Figure 3:
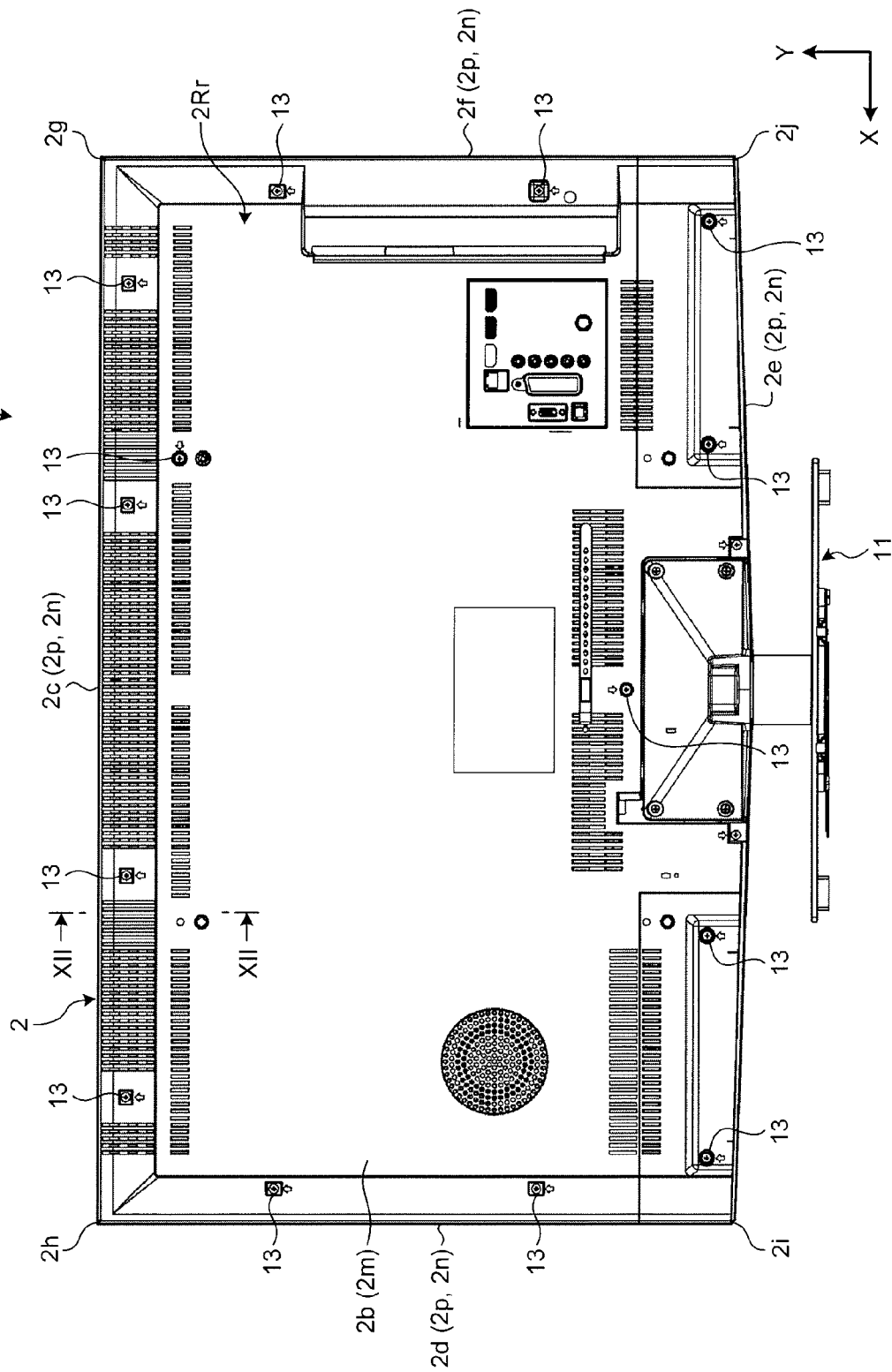
FIG. 3 is an exemplary back view of the TV receiver in the embodiment.

As illustrated in FIGS. 1 to 3, a TV receiver 1 as an example of an electronic device of the embodiment comprises a support portion 11 (base, stand) and the housing 2. The support portion 11 is placed on, for example, a desk, a table, or the like (not illustrated), and supports the housing 2. The support portion 11 may fixedly or movably (rotatably, slidably) support the housing 2. The support portion 11 may be, for example, tilted, pivoted, or swiveled with respect to the housing 2.

As illustrated in FIGS. 1 to 3, in the embodiment, for example, the housing 2 has a quadrangular shape (in the embodiment, for example, rectangular shape) in the front view (and the back view). The housing 2 is thin in the front-back direction and in a flat rectangular parallelepiped shape. The housing 2 comprises a front surface 2a (surface, first surface) and a back surface 2b (surface, second surface) opposite the front surface 2a. The front surface 2a and the back surface 2b are substantially parallel to each other. In the front view (and the back view), the housing 2 comprises four edges 2c to 2f (sides, peripheries) and four corners 2g to 2j (points, curves, ends). The edges 2c and 2e are examples of long sides, while the edges 2d and 2f are examples of short sides.

The housing 2 further comprises a wall 2k (first wall, first portion, plate, frame, front wall, top wall) having the front surface 2a and a wall 2m (second wall, second portion, plate, back wall, rear wall, bottom wall) having the back surface 2b. The wall 2k has a quadrangular frame shape (in the embodiment, for example, rectangular frame shape), and the wall 2m has a quadrangular shape (in the embodiment, for example, rectangular shape). The housing 2 comprises four walls 2n (third walls, third portions, plates, side walls, edge walls) having a side surface 2p (surface, peripheral surface, third surface) between the walls 2k and 2m. The wall 2k is provided with, for example, a rectangular opening 2r. The housing 2 may be made of a synthetic resin material or a metal material.

As illustrated in FIG. 2, the housing 2 may be formed of a combination of a plurality of components (parts, members). For example, the housing 2 comprises a first member 2Fr (first portion, front member, cover, bezel, frame) including at least the wall 2k and a second member 2Rr (second portion, rear member, base, bottom, case) including at least the wall 2m. The walls 2n may be included in at least one of the first member 2Fr and the second member 2Rr (in the embodiment, for example, both the first member 2Fr and the second member 2Rr).

As illustrated in FIGS. 1, 4 to 6, the housing 2 houses therein a display device 6 (display module, display, panel). The display device 6 comprises the display screen 6a on the front surface 2a side. The display screen 6a is exposed from the opening 2r to the front side (outside) of the housing 2. The user can view the display screen 6a through the opening 2r from the front side. The display device 6 has a quadrangular shape (in the embodiment, for example, rectangular shape) in the front view. The display device 6 is thin in the front-back direction and in a flat rectangular parallelepiped shape. The display device 6 comprises, for example, a liquid crystal display (LCD), an organic electroluminescence display (OELD), or the like. The display device 6 may be provided on the front side with a thin plate-like or sheet-like transparent touch panel (input panel, input sheet, input device, not illustrated) that covers the display screen 6a.

Figure 4:
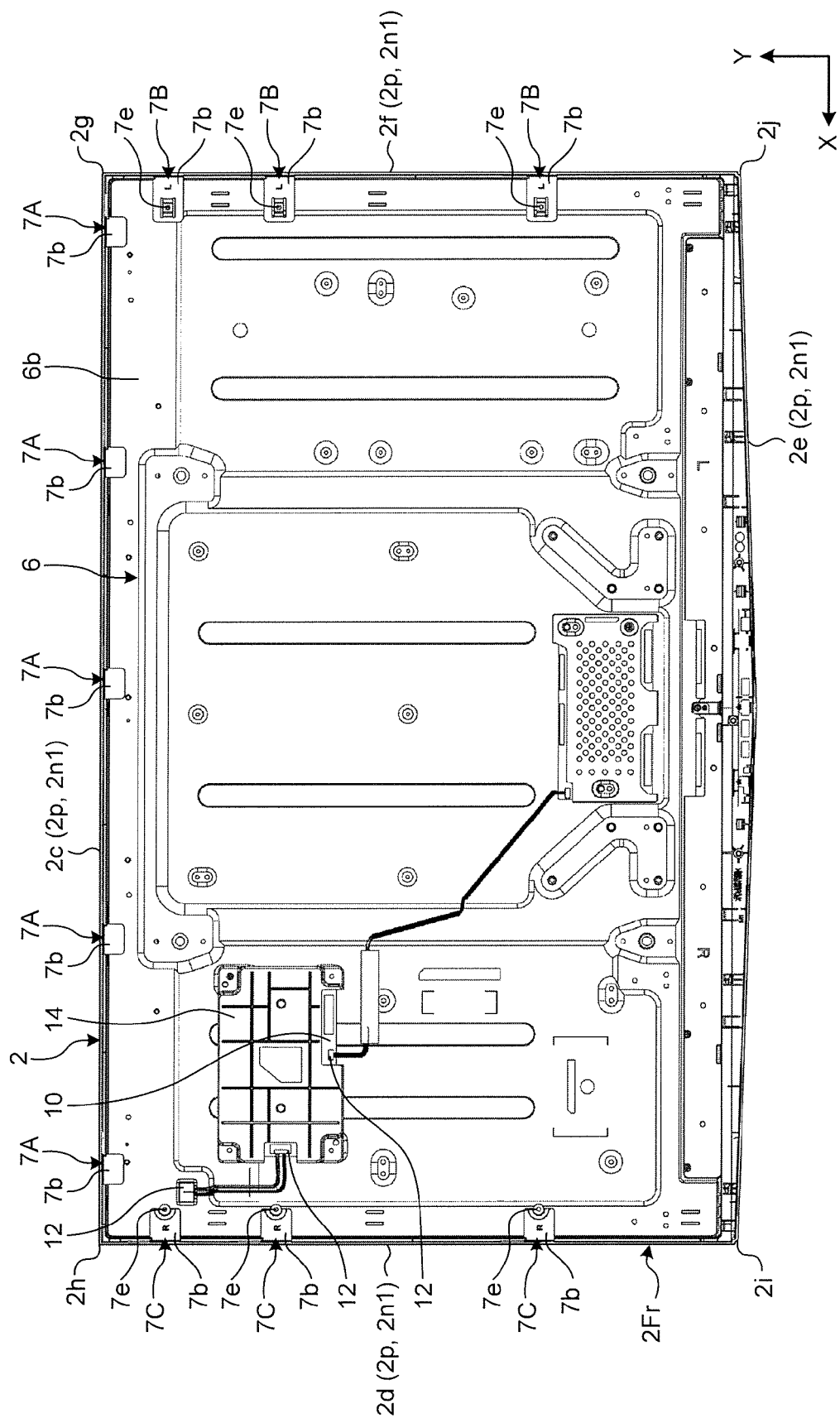
FIG. 4 is an exemplary back view of the TV receiver without a second member in the embodiment.

As illustrated in FIG. 4, in the embodiment, for example, the housing 2 houses a circuit board 10 (control board, main board, printed circuit board) on the back side of the display device 6 (rear side, the wall 2m side, opposite side to the display screen 6a). The circuit board 10 is arranged in parallel to a surface 6b (back surface) of the display device 6. Besides, the circuit board 10 is arranged spaced apart from the walls 2k, 2m, 2n, and the like. That is, there is a space between the circuit board 10 and the walls 2k, 2m, and 2n. The circuit board 10 is fixed to the display device 6 by a fastener such as, for example, a screw (not illustrated). The circuit board 10 is covered with a cover 14.

In addition to a connector 12, a plurality of components (electronic components, devices, not illustrated) such as a central processing unit (CPU) are mounted on the circuit board 10. The electronic components include a heat generating component. A cooling mechanism (heat receiver, heat transmitter, radiator, fan, etc., not illustrated) may be provided for an electronic component (heat generating component) that generates a large amount of heat. The circuit board 10 and the electronic components form at least part of a control circuit (not illustrated). The control circuit may comprise, for example, a video signal processing circuit, a tuner, a high-definition multimedia interface (HDMI) signal processor, an audio-video (AV) input terminal, a remote controller signal receiver, a controller, a selector, an on-screen display interface, a storage module (e.g., a read only memory (ROM), a random access memory (RAM), a hard disk drive (HDD), etc.), an audio signal processing circuit, and the like. The control circuit controls the output of video (moving images, still images, etc.) on the display screen 6a of the display device 6, the output of sound from a speaker (not illustrated), the light emission of a light-emitting diode (LED) (not illustrated), and the like. The display device 6, the speaker, the LED, and the like are part of an output module.

In the first embodiment, for example, the first member 2Fr and the second member 2Rr of the housing 2 are supported by (fixed to) the display device 6. The first member 2Fr and the second member 2Rr are at least partly fixed to the display device 6 via support members 7A to 7C. The support members 7A to 7C may be made of, for example, a metal material. At least one of the first member 2Fr and the second member 2Rr may be partly fixed to the display device 6 without via the support members 7A to 7C.

Figure 5:
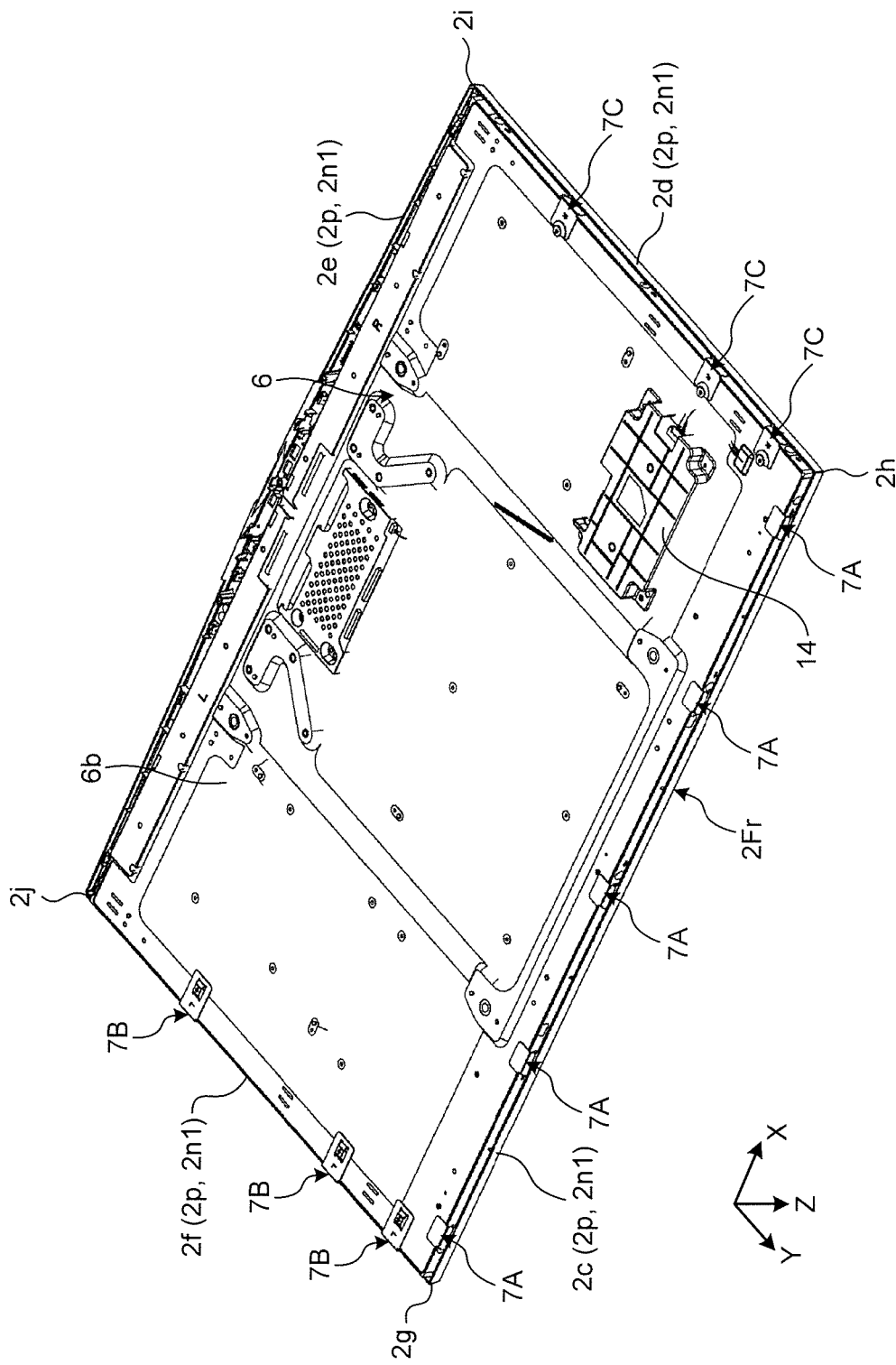
FIG. 5 is an exemplary perspective view of the TV receiver without the second member in the embodiment.
Figure 6:
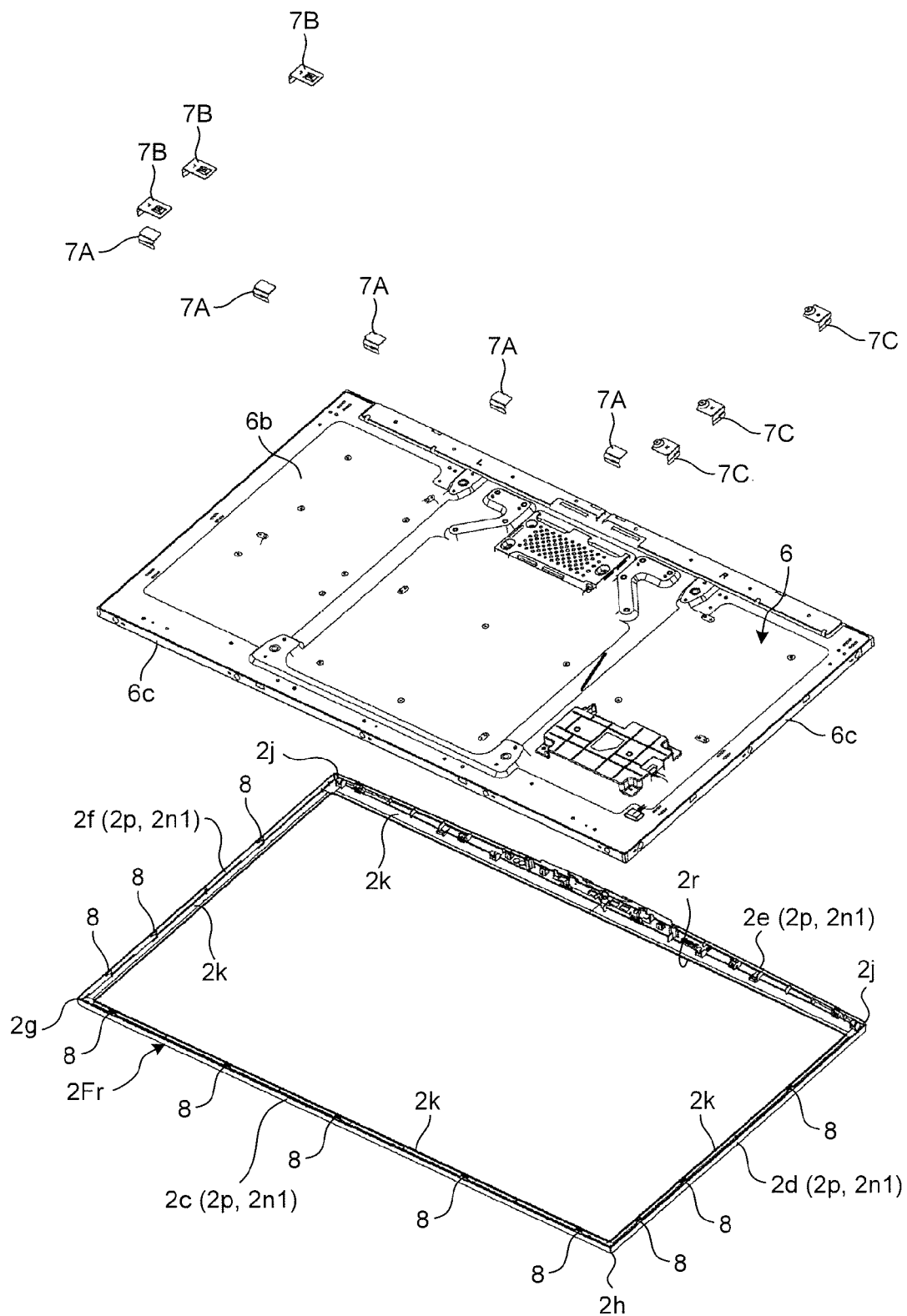
FIG. 6 is an exemplary exploded perspective view of a first member, a display device, and support members of the TV receiver in the embodiment.

As illustrated in FIGS. 4 to 6, in the embodiment, for example, a plurality of the support members 7A to 7C are fixed to the back (rear) of the first member 2Fr. More specifically, in the embodiment, for example, five pieces of the support members 7A are fixed along the edge 2c, three pieces of the support members 7C are fixed along the edge 2d, and three pieces of the support members 7B are fixed along the edge 2f.

Figure 7:
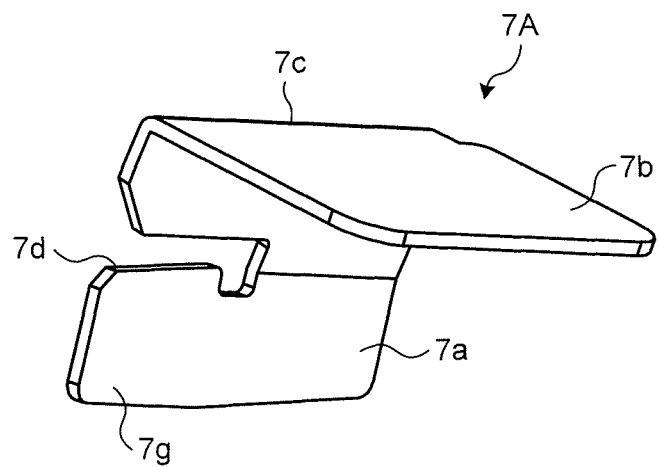
FIG. 7 is an exemplary perspective view of the support member of the TV receiver in the embodiment.
Figure 8:
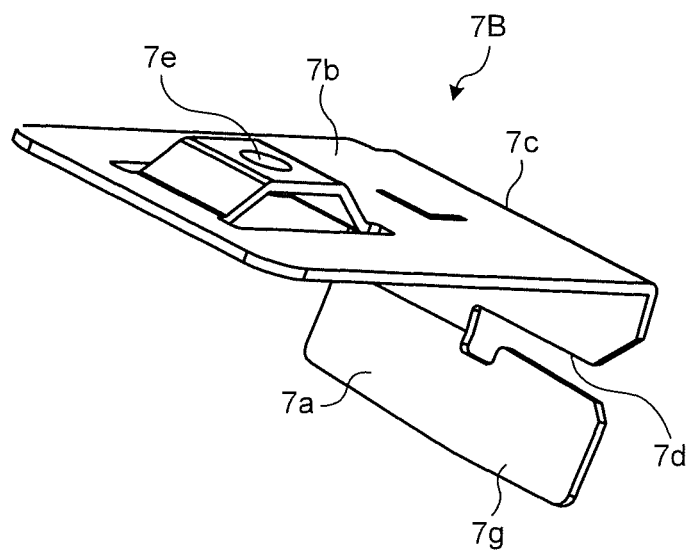
FIG. 8 is an exemplary perspective view of another support member of the TV receiver in the embodiment.
Figure 9:
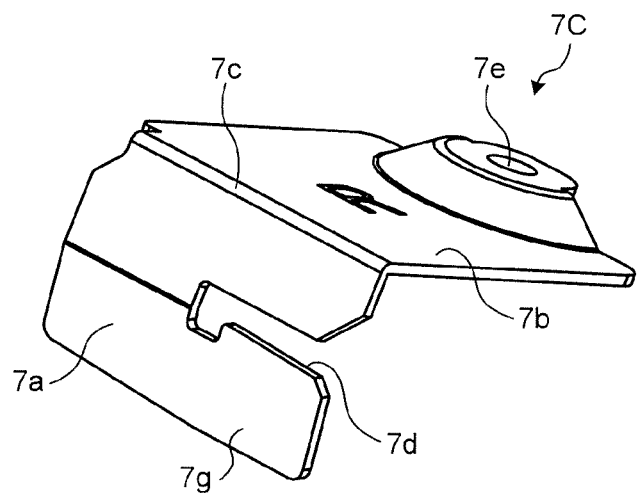
FIG. 9 is an exemplary perspective view of still another support member of the TV receiver in the embodiment.

As illustrated in FIGS. 7 to 9, in the embodiment, for example, the support members 7A to 7C each have a wall 7a and a wall 7b. The walls 7a and 7b are connected in L-shape. That is, the support members 7A to 7C has an L-shaped cross section.

Figure 10:
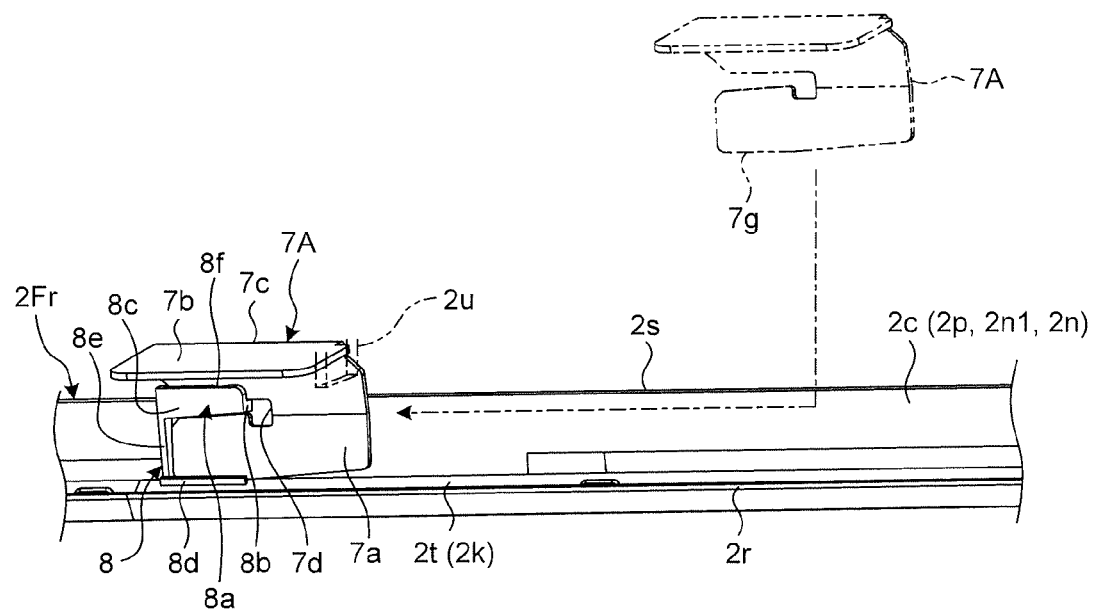
FIG. 10 is an exemplary perspective view of part of the first member and the support member of the TV receiver in the embodiment.
Figure 12:
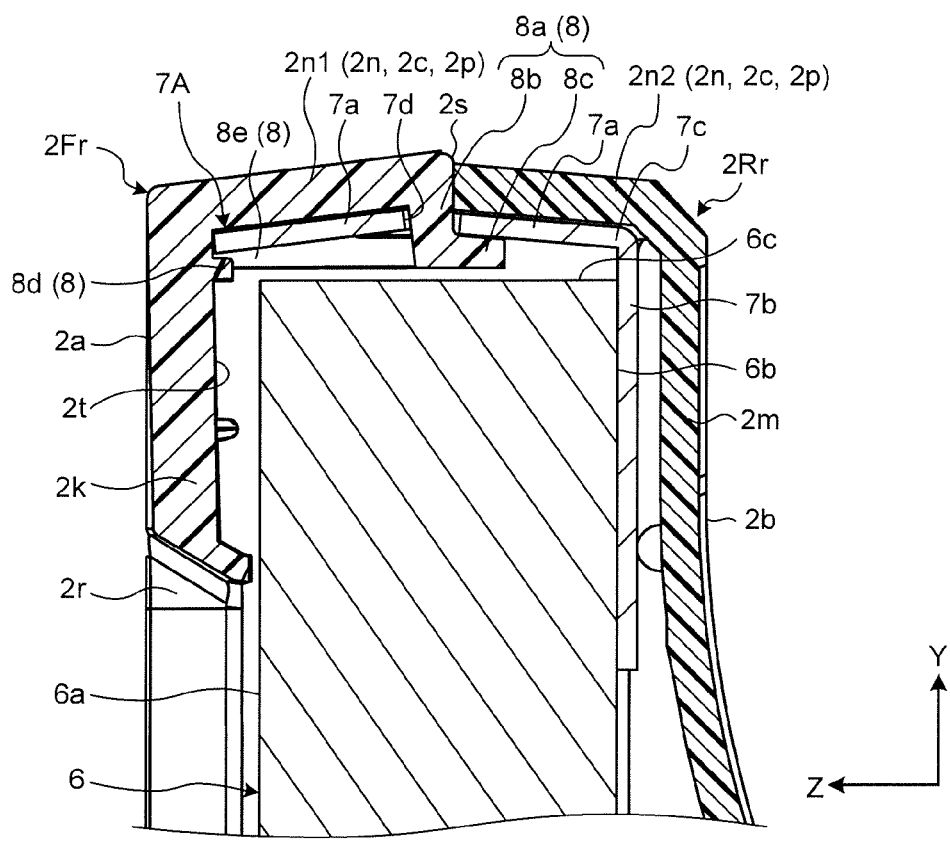
FIG. 12 is an exemplary cross-sectional view taking along line XII-XII in FIG. 3 in the embodiment.

As illustrated in FIG. 10, in the embodiment, for example, the wall 7a is located along a wall (first wall) 2n1 (2n) of the first member 2Fr inside the housing 2. Meanwhile, the wall 7b is connected to an edge 7c on the back side of the wall 7a, and is located along the surface 6b (back surface, rear surface, surface opposite to the display screen 6a) as illustrated in FIG. 4. The support members 7A to 7C may be formed by bending a plate-like material. In this case, the edge 7c is a bent portion between the walls 7a and 7b. The wall 7a is fixed to the first member 2Fr. Accordingly, as illustrated in FIG. 12, the display device 6 is located between the wall 2k of the first member 2Fr and the wall 7b of the support members 7A to 7C fixed to the first member 2Fr. In other words, the periphery of the display device 6 is surrounded from the outside by the wall 2k, the wall 2n of the first member 2Fr, and the walls 7a and 7b of the support members 7A to 7C. While the support members 7A to 7C have the wall 7b of different structure, the walls 7a and 7b of the support members 7A to 7C sandwiching the display device 6 or surrounding the periphery of the display device 6 have the same function.

As illustrated in FIGS. 7 to 10, in the embodiment, for example, the support members 7A to 7C are provided with a slit 7d (notch, opening). Part of a support portion 8 (in the embodiment, for example, a wall 8b) provided to the housing 2 is inserted in the slit 7d, which fixes the support members 7A to 70 to the support portion 8. More specifically, in the embodiment, the slit 7d is configured as a notch that extends from the center in the height direction (the thickness direction of the housing 2 and the display device 6) of an edge of the wall 7a in the width direction (the longitudinal direction of a side surface 6c of the display device 6) along the width direction up to the center in the width direction.

Figure 11:
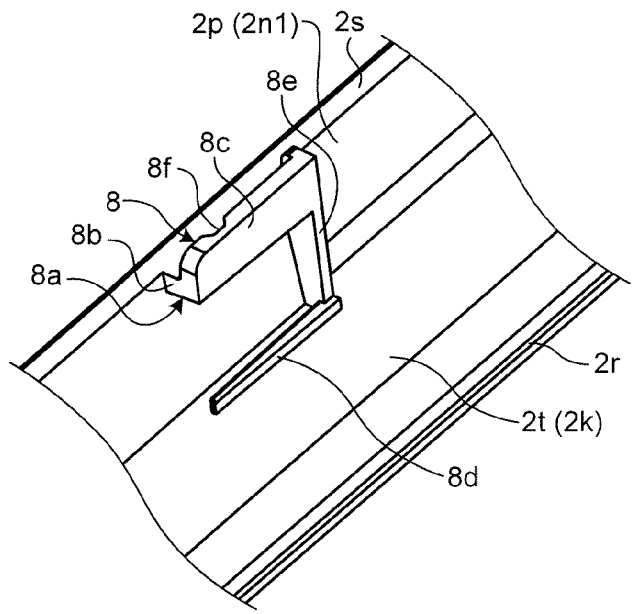
FIG. 11 is an exemplary perspective view of part of the first member of the TV receiver in the embodiment.

As illustrated in FIGS. 10 and 11, in the embodiment, for example, the first member 2Fr is provided with the support portion 8 that supports the support members 7A to 7C. The support portion 8 comprises a protrusion 8a. As illustrated in FIG. 12, the protrusion 8a comprises walls 8b and 8c. The wall 8b protrudes from an end 2s of the first member 2Fr on the second member 2Rr side toward the side surface 6c of the display device 6 (toward the inside of the housing 2). The wall 8b extends along the periphery of the display device 6 (along the longitudinal direction of the wall 2n). Meanwhile, the wall 8c protrudes from a portion of the wall 8b spaced apart from a wall 2n2 (second wall) of the second member 2Rr along the second member 2Rr toward the opposite side of the display screen 6a (the surface 6b side). The wall 8c also extends along the periphery of the display device 6 (along the longitudinal direction of the wall 2n). Namely, as a whole, the protrusion 8a extends in an L-shape from the wall 2n1 of the first member 2Fr toward the inside of the housing 2. The wall 8c is an example of a portion that extends on the side of the surface 6c of the wall 2n 2 toward the opposite side of the display screen 6a.

As illustrated in FIGS. 10 to 12, in the embodiment, for example, the support portion 8 has a protrusion 8d separated from the protrusion 8a to the display screen 6a side. In the embodiment, for example, the protrusion 8d protrudes from a back surface 2t (rear surface) of the wall 2k toward the opposite side of the display screen 6a (back side, back surface side, rear side, rear surface side). The protrusion 8d extends along the wall 2n 1 of the first member 2Fr. The protrusion 8d may be provided to the wall 2n 1. In this case, for example, as with the protrusion 8a, the protrusion 8d may be configured to extend in an L-shape (hook shape) from the wall 2n 1 toward the opposite side of the display screen 6a. However, if provided to the back surface 2t of the wall 2k, the protrusion 8d can be simply structured. Besides, an external force toward the inside of the housing 2 acting on the wall 2n 1 can be transmitted to the wall 2k through the support members 7A to 7C and the protrusion 8d, which increases the rigidity.

As illustrated in FIGS. 10 to 12, in the embodiment, for example, the support members 7A to 7C are fixed to the protrusions 8a and 8d of the support portion 8. More specifically, for example, as illustrated in FIG. 10, by inserting an edge 7g (edge of the wall 7a opposite the edge 7c) separated from the slit 7d of the support members 7A to 7C into between the protrusion 8d and the wall 2n 1 of the first member 2Fr as well as inserting the wall 8b into the slit 7d, the support members 7A to 7C are engaged with the support portion 8. With this, the support members 7A to 7C are fixed to the support portion 8. In this structure, if an external force acts on the support members 7A to 7C in the direction in which they fall over to the outside of the housing 2 before the second member 2Rr is attached (i.e., in the state where the support members 7A to 7C are temporarily held by the support portion 8 of the first member 2Fr), the support members 7A to 7C are mainly supported by the wall 2n 1 of the first member 2Fr and the protrusion 8d. If an external force acts on the support members 7A to 7C in the direction in which they fall over to the inside of the housing 2 before the second member 2Rr is attached, the support members 7A to 7C are mainly supported by the wall 2n 1 of the first member 2Fr and the wall 8c of the protrusion 8a. After the second member 2Rr is attached, as illustrated in FIG. 12, the wall 7a of the support members 7A to 7C is sandwiched between the wall 2n 2 of the second member 2Rr and the wall 8c of the protrusion 8a. Accordingly, if an external force toward the inside of the housing 2 acts on the wall 2n 2 of the second member 2Rr, the external force can be received by the wall 2n 2, the wall 7a, and the wall 8c. That is, with the structure of the embodiment, the wall 8c increases the rigidity or strength against an external force toward the inside of the housing 2 acting on the wall 2n 2 of the second member 2Rr. Incidentally, the support members 7A to 7C are attached to the support portion 8 after the first member 2Fr and the display device 6 are arranged in a positional relationship in the assembly state. In the embodiment, the protrusion 8a is an example of a support portion, while the protrusion 8d is an example of a second support portion.

In the embodiment, for example, the support members 7B and 7C attached to the wall 2n 1 extending vertically are slid from up to down to be attached to (inserted into) the support portion 8. In this structure, the support members 7B and 7C are hooked on the support portion 8 when the first member 2Fr stands in the same orientation as assembled. Thus, according to the embodiment, for example, while being attached to the first member 2Fr during assembly, the support members 7B and 7C are prevented from coming off the support portion 8 due to due to the gravity force, vibration, or the like.

In the embodiment, for example, the support members 7A attached to the wall 2n 1 extending horizontally are all slid from the right to the left in the back view to be attached to (inserted into) the support portion 8. Different attachment directions result in that the support members 7A each have a component of different shape. Regarding this, according to the embodiment, for example, the manufacturing cost of the support members 7A can be reduced. Moreover, according to the embodiment, for example, it is possible to reduce human error as well as to increase work efficiency. Incidentally, all the support members 7A may be slid from the left to the right in the back view to be attached to the support portion 8.

As illustrated in FIGS. 10 and 11, in the embodiment, for example, the support portion 8 comprises a protrusion 8e extending over between the protrusions 8a and 8d. The protrusion 8e protrudes from the wall 2n 1 of the first member 2Fr toward the inside of the housing 2 (toward the surface 6c). The protrusion 8e extends in a direction crossing the longitudinal direction of the protrusions 8a and 8d (in the embodiment, for example, a direction crossing the display screen 6a, front-back direction). For example, this structure further increases the rigidity of the support portion 8. In the embodiment, for example, the protrusion 8e is located at the forefront of the direction in which the support members 7A to 7C are slid to the support portion 8 (insertion direction). Accordingly, for example, the protrusion 8e may be used as a stopper upon attachment of the support members 7A to 7C. The protrusion 8e is an example of an extending portion.

As illustrated in FIG. 10, in the embodiment, for example, the second member 2Rr may be provided with a protrusion 2u protruding toward the first member 2Fr. The protrusion 2u is located near the front (back) of the direction in which the support members 7A to 7C are slid (insertion direction). With this structure, for example, the protrusion 2u prevents the support members 7A to 7C from coming off the support portion 8. The protrusion 2u is an example of a second engagement portion.

As illustrated in FIGS. 8 and 9, in the embodiment, the support members 7B and 7C are provided with a fixing portion 7e to fix a fastener 13. The fixing portion 7e may be, for example, a female screw portion (female screw hole). The fastener 13 passes through an opening (e.g., through hole, notch, not illustrated) in the wall 2m of the second member 2Rr from the back surface 2b side, and is fastened to the fixing portion 7e. In other words, the support members 7B and 7C also functions as a bracket to fix the second member 2Rr to the display device 6. For example, this structure eliminates the need to provide a fixing portion for the fastener 13 to the display device 6, and thereby simplifies the manufacturing process of the display device 6. Moreover, for example, the versatility of the display device 6 can be expanded.

However, in the embodiment, for example, the fastener 13 is not fixed to the uppermost one of the three support members 7B and 7C. More specifically, in the embodiment, for example, the support members 7B and 7C that are not coupled with the second member 2Rr by the fastener 13 (in the embodiment, for example, the uppermost support members 7B and 7C in FIG. 4) are provided closer to the corners 2g and 2h of the housing 2, respectively, than the support members 7B and 7C coupled with the second member 2Rr by the fastener 13 on the surface 6b side of the display device 6 (in the embodiment, for example, the second and third support members 7B and 7C from the top). At the corners 2g and 2h of the housing 2, the first member 2Fr is likely to be away from the display device 6. Besides, as the distance increases between a position where the support members 7B and 7C are fixed to the display device 6 via the fastener 13 (i.e., the position of the support portion 8) and the corners 2g and 2h, the first member 2Fr is likely to be away from the display device 6. On the other hand, the second member 2Rr has a higher rigidity than the first member 2Fr because of the wall 2m, and is less likely to be away from the display device 6 than the first member 2Fr. Accordingly, for example, it is possible to obtain a structure in which the first member 2Fr and the second member 2Rr are easily fixed to the display device 6 via the support members 7B and 7C while having a required rigidity with a smaller number of components. In the embodiment, for example, there are provided the support members 7B and 7C having the fixing portion 7e to which the fastener 13 is not fastened (in the embodiment, for example, the uppermost support members 7B and 7C in FIG. 4). This encourages the common use of components and thereby reduces the manufacturing cost as well as simplifying the manufacturing process.

As described above, in the TV receiver 1 as an electronic device according to the embodiment, the support portion 8 that supports the support members 7A to 7C is provided to the end 2s of the first member 2Fr on the second member 2Rr side. The wall 8c extends toward the opposite side of the display screen 6a on the surface 6c side of the second wall 2n 2 and supports the support members 7A to 7C with the second wall 2n 2 therebetween. For example, this enables a structure in which the wall 7a is located between the second wall 2n 2 and the wall 8c on the second member 2Rr side at the boundary between the first member 2Fr and the second member 2Rr. Thus, the rigidity of the housing 2 as well as the support members 7A to 7C can be improved. Besides, the support portion 8 (the protrusion 8e thereof) is provided to the end 2s of the first member 2Fr on the second member 2Rr side, which, for example, makes sink marks less visible.

According to the embodiment, the support portion 8 comprises the protrusion 8a as a support portion and the protrusion 8d as a second support portion that is separated from the protrusion 8a on the side near the display screen 6a. With this, for example, the support members 7A to 7C can be prevented from falling over with a simple structure.

According to the embodiment, there is provided the protrusion 8e extending over between the protrusion 8a (the wall 8b) as a support portion and the protrusion 8d as a second support portion. This, for example, increases the rigidity of the support portion 8.

According to the embodiment, the support members 7B and 7C are slid down in a direction along the longitudinal direction of the side surface 6c to be attached to the support portion 8. Thus, for example, when the first member 2Fr stands in the same orientation as being assembled, the support members 7B and 7C that are temporarily held by the first member 2Fr are prevented from coming off the support portion 8.

According to the embodiment, the support members 7A are slid to the same side of the left and right sides of a direction along the longitudinal direction of the side surface 6c to be attached to the support portion 8. This, for example, encourages the common use of components and thereby reduces the manufacturing cost. Moreover, for example, the support members 7A can be easily attached to the support portion 8.

According to the embodiment, the second member 2Rr is provided with the protrusion 2u as a second engagement portion that engages with the support members 7A to 7C on the other side of a direction along the longitudinal direction of the side surface 6c with respect to the support members 7A to 7C. Thus, for example, the support members 7A to 7C can be prevented from coming off the support portion 8.

Figure 13:
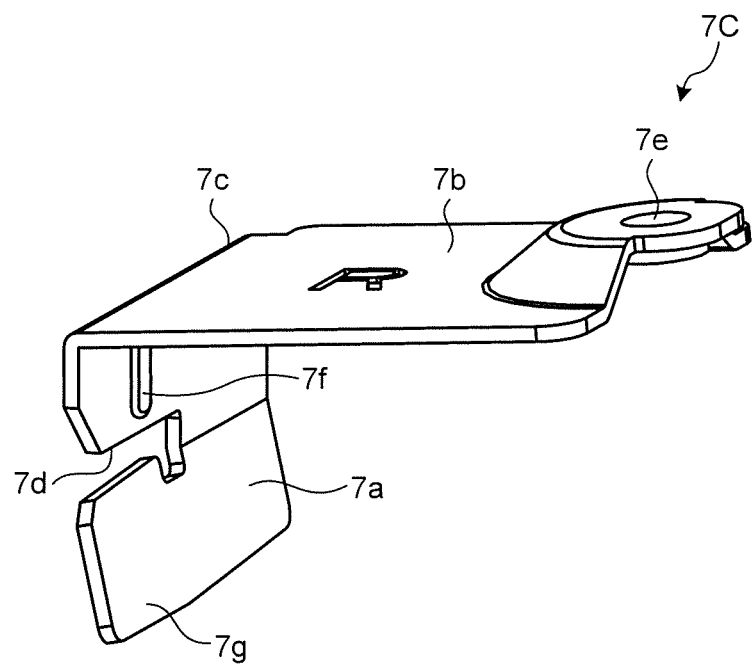
FIG. 13 is an exemplary perspective view of a support member of a TV receiver according to a modification of the embodiment.

The embodiment is susceptible to various modifications and alternative forms. For example, as illustrated in FIG. 13, an engagement portion 8f to prevent the support members 7A to 7C from coming off the support portion 8 may be provided to the first member 2Fr (the housing 2) as a recess, while an engagement portion 7f corresponding thereto may be provided to the wall 7a of the support members 7A to 7C as a protrusion. The engagement portions 7f and 8f may form a snap-fit mechanism using elastic deformation. This structure also prevents the support members 7A to 7C from coming off the support portion 8. Incidentally, the support members 7A to 7C may be provided with a recess, while the support portion 8 may be provided with a protrusion. Further, the embodiment and the modifications may be combined as appropriate. Besides, the specifications (structure, type, direction, shape, size, length, width, thickness, height, number, arrangement, location, material, etc.) of the constituent elements can be suitably modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television receiver comprising:
a display device comprising a front surface providing a display screen, a back surface, and a side surface;
a housing that houses the display device, the housing including a first member located adjacent the front surface and comprising a first wall that faces the side surface,
and a second member located adjacent the back surface and comprising a second wall that faces the side surface;
a plurality of support portions fixed to the first wall, each support portion including a protrusion which extends toward the side surface and a lip which extends from the protrusion toward the back surface;
a plurality of support members located on the first wall extending horizontally in a front view of the display screen on a side of the side surface extending horizontally;
wherein each of the plurality of support members includes a slit and a fixing portion, each of the plurality of support members being attached to the first member by inserting the protrusion into the slit with the lip on an opposite side of the support member from the side surface of the first wall, the support member configured to support the display device between the first member and the support member;
a plurality of engagement portions fixed to the second member, each of the plurality of engagement portions being located adjacent one of the plurality of support members to prevent the support member from sliding when the second member is located adjacent the back surface.

2. The television receiver of claim 1, further comprising
a second support portion located closer to the display screen than the support portion of the first member and separated from the support portion,
the second support portion configured to engage with the support member.

3. The television receiver of claim 2, further comprising
an extending portion located on a side of the side surface of the first member and extending over between the support portion and the second support portion.

4. The television receiver of claim 1, wherein
the support member is located on the first wall extending vertically on a side of the side surface, and
the support member is configured to be slid to a down side of a longitudinal direction of the side surface to be attached to the support portion.

5. The television receiver of claim 1, wherein one of the plurality of support portions comprises
a second engagement portion configured to engage one of the plurality of support members to prevent the support member from sliding on the support portion.

6. An electronic device comprising:
a display device comprising a front surface providing a display screen, a back surface, and a side surface;
a housing that houses the display device, the housing including a first member located adjacent the front surface and comprising a first wall that faces the side surface,
and a second member located adjacent the back surface and comprising a second wall that faces the side surface;
a plurality of support portions fixed to the first wall, each support portion including a protrusion which extends toward the side surface and a lip which extends from the protrusion toward the back surface;
a plurality of support members located on the first wall extending horizontally in a front view of the display screen on a side of the side surface extending horizontally;
wherein each of the plurality of support members includes a slit and a fixing portion, each of the plurality of support members being attached to the first member by inserting the protrusion into the slit with the lip on an opposite side of the support member from the side surface of the first wall, the support member configured to support the display device between the first member and the support member;
a plurality of engagement portions fixed to the second member, each of the plurality of engagement portions being located adjacent one of the plurality of support members to prevent the support member from sliding when the second member is located adjacent the back surface.

7. The electronic device of claim 6, further comprising a second support portion located closer to the display screen than the support portion of the first member and separated from the support portion, the second support portion configured to engage with the support member.

8. The electronic device of claim 7, further comprising an extending portion located on a side of the side surface of the first member and extending over between the support portion and the second support portion.

9. The electronic device of claim 6, wherein
the support member is located on the first wall extending vertically on a side of the side surface, and the support member is configured to be slid to a down side of a longitudinal direction of the side surface to be attached to the support portion.

10. The electronic device of claim 6, wherein
one of the plurality of support portions comprises a second engagement portion configured to engage one of the plurality of support members to prevent the support member from sliding on the support portion.

* * * * *